(12) United States Patent
Wang

(10) Patent No.: US 11,055,065 B2
(45) Date of Patent: Jul. 6, 2021

(54) PUF-BASED TRUE RANDOM NUMBER GENERATION SYSTEM

(71) Applicant: eMemory Technology Inc., Hsin-Chu (TW)

(72) Inventor: Chih-Min Wang, Hsinchu County (TW)

(73) Assignee: eMemory Technology Inc., Hsin-Chu (TW)

( * ) Notice: Subject to any disclaimer, the term of this patent is extended or adjusted under 35 U.S.C. 154(b) by 149 days.

(21) Appl. No.: 16/292,330

(22) Filed: Mar. 5, 2019

(65) Prior Publication Data
US 2019/0324725 A1 Oct. 24, 2019

Related U.S. Application Data

(60) Provisional application No. 62/659,150, filed on Apr. 18, 2018.

(51) Int. Cl.
*G06F 7/58* (2006.01)
*H04L 9/08* (2006.01)
*H04L 9/32* (2006.01)

(52) U.S. Cl.
CPC .............. *G06F 7/588* (2013.01); *G06F 7/582* (2013.01); *H04L 9/0869* (2013.01); *H04L 9/3278* (2013.01)

(58) Field of Classification Search
CPC ............. G06F 7/58–588; H03L 9/0869; H03L 9/3278
See application file for complete search history.

(56) References Cited

U.S. PATENT DOCUMENTS

| | | | |
|---|---|---|---|
| 7,047,262 B2 * | 5/2006 | Hars | G06F 7/588 708/255 |
| 2004/0039762 A1 | 2/2004 | Hars | |
| 2004/0049525 A1 * | 3/2004 | Hars | G06F 7/584 708/250 |
| 2006/0039558 A1 * | 2/2006 | Morii | H04L 9/0668 380/46 |

(Continued)

FOREIGN PATENT DOCUMENTS

| | | |
|---|---|---|
| EP | 2 695 052 A2 | 2/2014 |
| EP | 2 695 052 B1 | 11/2014 |

(Continued)

OTHER PUBLICATIONS

M. Wu et al., "A PUF scheme using competing oxide rupture with bit error rate approaching zero," 2018 IEEE International Solid-State Circuits Conference—(ISSCC), San Francisco, CA, 2018, pp. 130-132, doi: 10.1109/ISSCC.2018.8310218. (Year: 2018).*

(Continued)

*Primary Examiner* — Aimee Li
*Assistant Examiner* — Carlo Waje
(74) *Attorney, Agent, or Firm* — Winston Hsu

(57) ABSTRACT

A true random number generation system includes a physical unclonable function (PUF) entropy device, a pseudo random number generator, and an encoding circuit. The PUF entropy device is used for generating a random number pool. The pseudo random number generator is used for generating a plurality of first number sequences. The encoding circuit is coupled to the PUF entropy device and the pseudo random number generator for generating a plurality of second number sequences according to the plurality of first number sequences and a plurality of third number sequences selected from the random number pool.

9 Claims, 6 Drawing Sheets

(56) References Cited

U.S. PATENT DOCUMENTS

| | | |
|---|---|---|
| 2007/0140485 A1 | 6/2007 | Ghigo |
| 2009/0204657 A1 | 8/2009 | Goettfert |
| 2014/0040338 A1 | 2/2014 | Van Der Sluis |
| 2014/0344321 A1* | 11/2014 | Hamilton ............ G06F 7/582 708/255 |
| 2016/0110165 A1* | 4/2016 | Kokubo ............... G06F 7/58 708/250 |
| 2017/0160939 A1 | 6/2017 | Atsumi |
| 2018/0102909 A1 | 4/2018 | Wu |
| 2018/0123808 A1* | 5/2018 | Hung ............... H04L 9/3278 |
| 2018/0293052 A1* | 10/2018 | Suresh ............... G06F 7/588 |
| 2019/0272151 A1* | 9/2019 | Wu ................... G06F 7/582 |

FOREIGN PATENT DOCUMENTS

| | | |
|---|---|---|
| JP | 2001-100980 A | 4/2001 |
| JP | 2002-544690 A | 12/2002 |
| JP | 2003-131867 A | 5/2003 |
| JP | 2005-536796 A | 12/2005 |
| JP | 2014-510354 A | 4/2014 |
| JP | 2016-126517 A | 7/2016 |
| JP | 2017-102844 A | 6/2017 |
| JP | 2017-130184 A | 7/2017 |
| TW | 201701186 A | 1/2017 |

OTHER PUBLICATIONS

N. Liu, S. Hanson, D. Sylvester and D. Blaauw, "OxID: On-chip one-time random ID generation using oxide breakdown," 2010 Symposium on VLSI Circuits, Honolulu, HI, 2010, pp. 231-232, doi: 10.1109/VLSIC.2010.5560287. (Year: 2010).*

Vincent van der Leest, Efficient Implementation of True Random Number Generator Based on SRAM PUFs, Cryptography and Security: From Theory to Applications pp. 300-318, Apr. 13, 2012.

* cited by examiner

PUF-BASED TRUE RANDOM NUMBER GENERATION SYSTEM

CROSS REFERENCE TO RELATED APPLICATIONS

This application claims the benefit of U.S. provisional application No. 62/659,150, filed Apr. 18, 2018.

BACKGROUND OF THE INVENTION

1. Field of the Invention

The present invention discloses a true random number generation system, and more particularly, a true random number generation system capable of performing a physical unclonable function to generate a long true random number bit stream.

2. Description of the Prior Art

With advancement of technologies, a network security, a data transmission security, and a privacy security have become important issues. To improve a security level, when data is regarded as privacy data bearing personal information, various encryption methods are required. For example, fingerprint data is regarded as unique and privacy data bearing personal physiological characteristics of a finger. Iris recognition data is regarded as unique and privacy data bearing personal physiological characteristics of two eyes. Generally, some security mechanisms are used for reducing regularity of privacy data in order to decrease a risk of data exfiltration. For example, a secured quick response code (SQRC) is used for protecting the privacy data by introducing a cryptography key. The regularity of the SQRC is hard to be predicted since the cryptography key is unknown for data stealers. However, any security mechanism still has a chance to be cracked since security keys (i.e., the cryptography keys), scramble polynomials, random number codeword sets, and mapping sequences are generated by using numerical-based functions. In other words, randomness of the security mechanisms is regarded as "pseudo" randomness.

However, the number of illegal hackers or data stealers increases year by year. The illegal hackers or data stealers have a chance to intrude into the security mechanisms since the illegal hackers or data stealers can use superb skill or unlicensed device to crack the security mechanisms. Therefore, a method for generating a true random number sequence without any regularity for applying to the security mechanisms is a trend for enhancing the security level.

SUMMARY OF THE INVENTION

In an embodiment of the present invention, a true random number generation system is disclosed. The true random number generation system comprises a physical unclonable function (PUF) entropy device, a pseudo random number generator, and a first encoding circuit. The PUF entropy device is configured to generate a random number pool. The pseudo random number generator is configured to generate a plurality of first number sequences according to at least one control sequence. The first encoding circuit is coupled to the PUF entropy device and the pseudo random number generator and configured to output a plurality of second number sequences according to the plurality of first number sequences and a plurality of third number sequences selected from the random number pool. The plurality of second number sequences are random.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
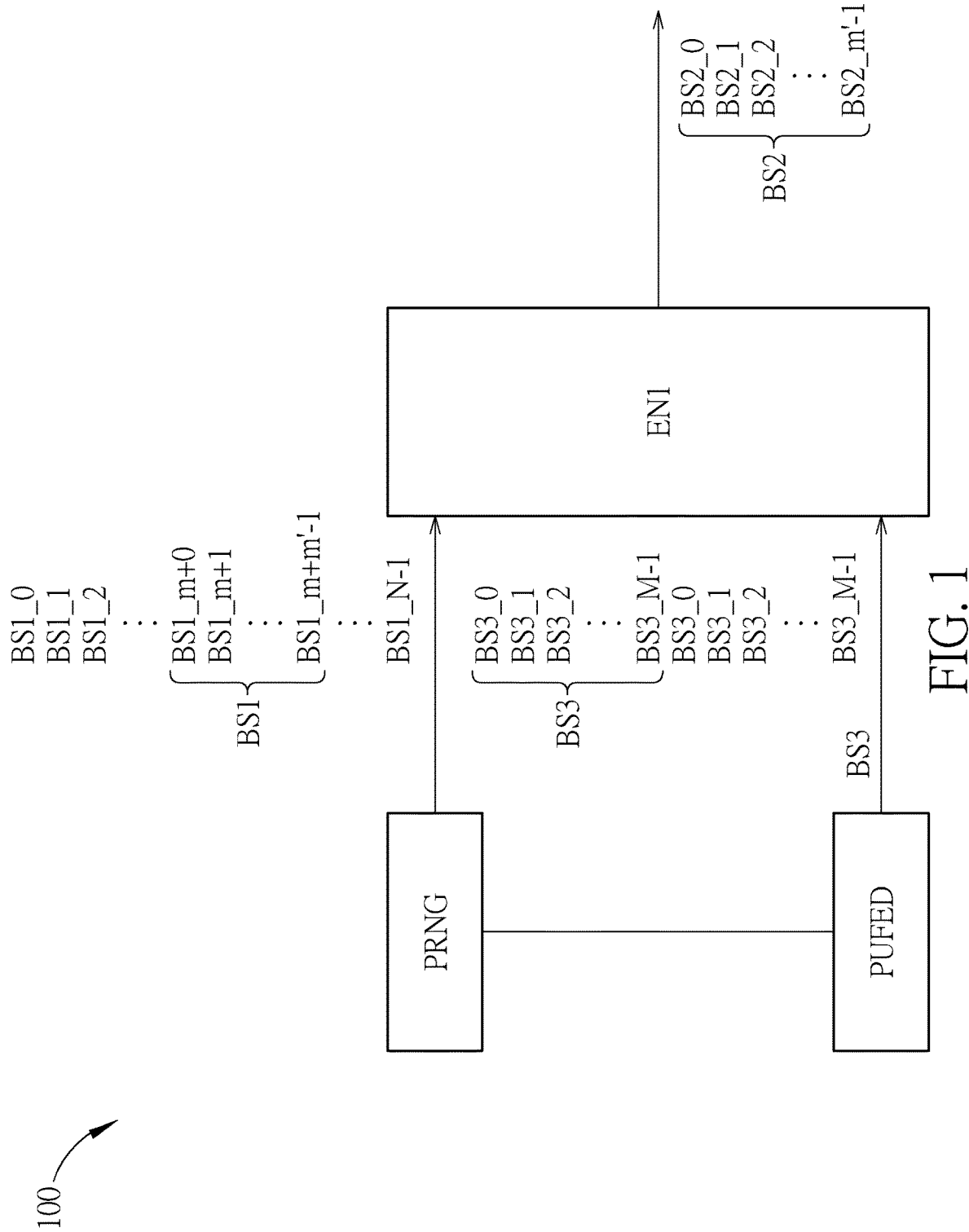
FIG. 1 is a block diagram of a true random number generation system according to an embodiment of the present invention.

FIG. 1 is a block diagram of a true random number generation system 100 according to an embodiment of the present invention. The true random number generation system 100 includes a physical unclonable function (PUF) entropy device PUFED, a pseudo random number generator PRNG, and a first encoding circuit EN1. The PUF entropy device PUFED is used for generating a random number pool. Here, the PUF entropy device PUFED can be any hardware capable of providing a unique identity by generating unclonable random number sequences. For example, the PUF entropy device PUFED can be an antifuse-based PUF device for randomly rupturing one of two gate oxide layers of adjacent transistors inside the PUF entropy device PUFED. In other words, randomness of rupturing one gate oxide layer can be regarded as a physical random activity. Therefore, when the PUF entropy device PUFED is the antifuse-based PUF device, the random number pool generated by using the PUF entropy device PUFED can be regarded as a finite true random entropy number pool. It is to be noted that the PUF entropy device PUFED can also be implemented by static random access memory cell (SRAM), resistive random access memory cell (ReRAM), magnetoresistive random access memory cell (MRAM), Ferroelectric random access memory cell (FeRAM), or a one-time programmable memory cell, multiple-time programmable memory cell, flash memory cell with true random bits storage. Equivalently, no regularity is introduced to the random entropy number pool. The pseudo random number generator PRNG is coupled to the PUF entropy device PUF for generating a plurality of first number sequences BS1. The plurality of first number sequences BS1 can be regarded as "pseudo" random number sequences since they are generated by using a numerical-based function. For example, all possible number sequences supported by the pseudo random number generator PRNG can be shown as a number sequence BS1_0 to a number sequence BS1_N−1. For an initial index "m", the pseudo random number generator PRNG can generate the plurality of first number sequences BS1 including a number sequence BS1_m+0 to BS1_m+m'−1. Here, m, m', and N are three positive integers, N≥m and N≥m'. The first encoding circuit EN1 is coupled to the PUF entropy device PUFED and the pseudo random number generator PRNG for outputting a plurality of second number sequences BS2 according to the plurality of first number sequences BS1 and a plurality of third number sequences BS3 selected from the random number pool. Here, since the random number pool is a finite number pool with small capacity, sequences selected from the random number pool can be duplicated to form a sequence set. For example, a sequence BS3_0 to a sequence BS3_M−1 can be selected from the random number pool. Then, the sequence BS3_0 to the sequence BS3_M−1 can be duplicated to form a sequence set {[BS3_0, . . . ,BS3_M−1], [BS3_0, . . . ,BS3_M−1]}. Then, the third number sequences BS3 can be determined by randomly or non-randomly selecting several sequences from the sequence set. The first encoding circuit EN1 can perform a bitwise exclusive-or function to generate the plurality of second number sequences BS2. For example, the second number sequences BS2 can include a sequence BS2_0 to a sequence BS2_m'−1. The sequence BS2_0 can be generated by combining the sequence BS1_0 with the sequence BS3_0 by using the bitwise exclusive-or function. The sequence BS2_1 can be generated by combining the sequence BS1_1 with the sequence BS3_1 by using the bitwise exclusive-or function, and so on. As previously mentioned, the first number sequences BS1 are pseudo random. The third number sequences BS3 is true random (i.e., physically generated by using the antifuse-based PUF). After the first encoding circuit EN1 combines the first number sequences BS1 with the third number sequences BS3 to generate the second number sequences BS2, regularity of the second number sequences BS2 cannot be predicted.

In terms of randomness, the plurality of first number sequences BS1 are less discrete than the plurality of second number sequences BS2 and the plurality of third number sequences BS3. Further, since the regularity of the second number sequences BS2 cannot be predicted, the second number sequences BS2 are "true" random sequences.

Further, a capacity requirement of the random number pool of the PUF entropy device PUFED can be around 2048 bits (2k bits). A length of each second number sequence BS2 can be equal to 32 bits. A length of each third number sequence BS3 can be equal to 32 bits. The plurality of first number sequences BS1 generated by the pseudo random number generator PRNG form a long pseudo random number bit stream. The plurality of third number sequences BS3 selected from the random number pool of the PUF entropy device PUFED form a short true random number bit stream. After the first encoding circuit EN1 combines the first number sequences BS1 with the third number sequences BS3 to generate the second number sequences BS2, the plurality of second number sequences BS2 form a long true random number bit stream. In other words, the true random number generation system 100 can generate the long true random number bit stream for applying to security mechanisms.

Any reasonable hardware modification falls into the scope of the present invention. For example, in another embodiment, the pseudo random number generator PRNG and the PUF entropy device PUFED are not coupled. Therefore, the at least one control sequence is not determined according to the random number pool. Further, the at least control sequence may be provided, generated, or determined by another data source, such as an user input data source. Here, the pseudo random number generator PRNG generates a plurality of first number sequences BS1 while the PUF entropy device PUFED generates a plurality of third number sequences BS3. The encoding circuit EN1 receives the plurality of first number sequences BS1 and the plurality of third number sequences BS3 and outputs a plurality of second number sequences BS2.

Figure 2:
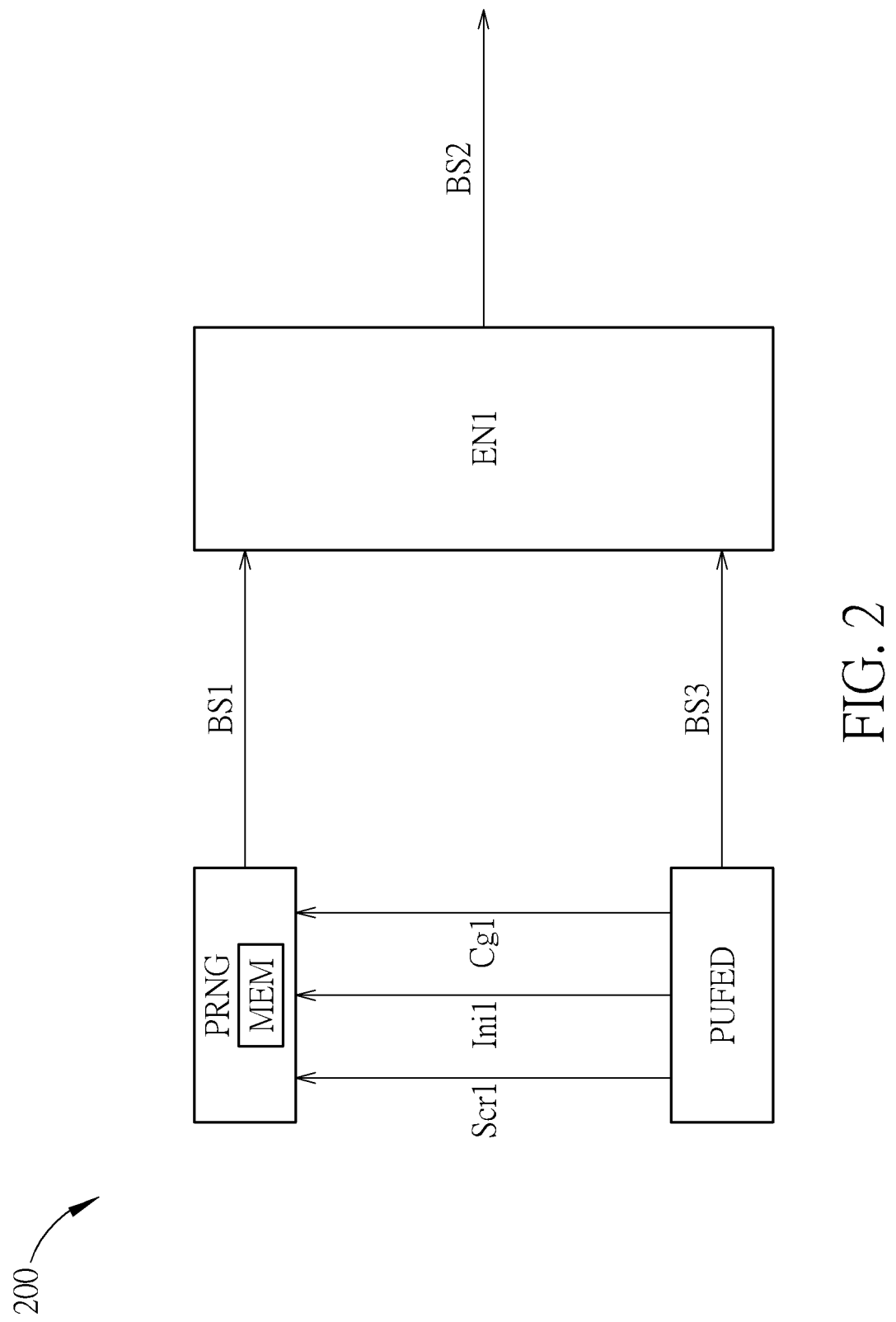
FIG. 2 is a block diagram of introducing at least one control sequence to the true random number generation system in FIG. 1.

FIG. 2 is a block diagram of introducing at least one control sequence to the true random number generation system 100. For avoiding ambiguity, it is called a true random number generation system 200 hereafter. In the true random number generation system 200, the pseudo random number generator PRNG can include a memory MEM for saving a control sequence set. At least one control sequence can be selected from the control sequence set according to the random number pool of the PUF entropy device PUFED. For example, the at least one control sequence can include a configuration sequence Cg1 determined according to the random number pool. The configuration sequence Cg1 can includes a plurality of configuration seeds. The plurality of configuration seeds can be used for determining a mapping correlation between the plurality of second number sequences BS2 and the plurality of first number sequences BS1 when an encoding operation is performed by the first encoding circuit EN1.

The at least one control sequence can include an initial sequence Ini1 determined according to the random number pool. The initial sequence Ini1 can include a plurality of initial seeds. The plurality of initial seeds can be used for indicating an initial number sequence of the first number sequences BS1 from all possible number sequences supported by the pseudo random number generator PRNG. The at least one control sequence can include a scramble sequence Scr1 determined according to the random number pool. The scramble sequence Scr1 can include a plurality of scramble seeds. The plurality of scramble seeds can be used for scrambling bit allocations of the plurality of first number sequences BS1. Further, codeword spaces of the control set of the configuration sequence Cg1, the initial sequence Ini1, and the scramble sequence Scr1 can be different. Also, the configuration sequence Cg1, the initial sequence Ini1, and the scramble sequence Scr1 can be generated by using any reasonable algorithm, transfer function, or numerical converter according to the random number pool. For the true random number generation system 200, random codes of the random number pool of the PUF entropy device PUFED can be used for "configuring" the at least one control sequence selected from the control set. For example, for the initial sequence Ini1 with a length of 32 bits, a corresponding codeword space includes $2^{32}-1$ possible variations. For the scramble sequence Scr1 with the length of 32 bits, a corresponding codeword space includes $2^{32}$ possible variations. Further, bit mapping of the random codes selected from the random number pool can be reasonably designed. For example, a one-to-one bit mapping or non-one-to-one bit mapping of the random codes of the random number pool can be introduced. For example, a random code bit [0] can correspond to a bit [0] of a deterministic random sequence of the control set by using a one-to-one mapping function. Random code bits [1] and [27] can correspond to a bit [15] of a deterministic random sequence of the control set by using a non-one-to-one mapping function. A random code bit [5] can correspond to bits [2] and [12] of a deterministic random sequence of the control set by using a non-one-to-one mapping function. In the true random number generation system 200, since the configuration sequence Cg1, the initial sequence Ini1, and the scramble sequence Scr1 can be randomly selected according to the random number pool, randomness of the first number sequences BS1 generated by the pseudo random number generator PRNG can be increased. Therefore, after the first encoding circuit EN1 combines the first number sequences BS1 with the third number sequences BS3 to generate the plurality of second number sequences BS2, the plurality of second number sequences BS2 can provide a high security level for applying to the security mechanisms since their regularity is hard to be predicted.

Figure 3:
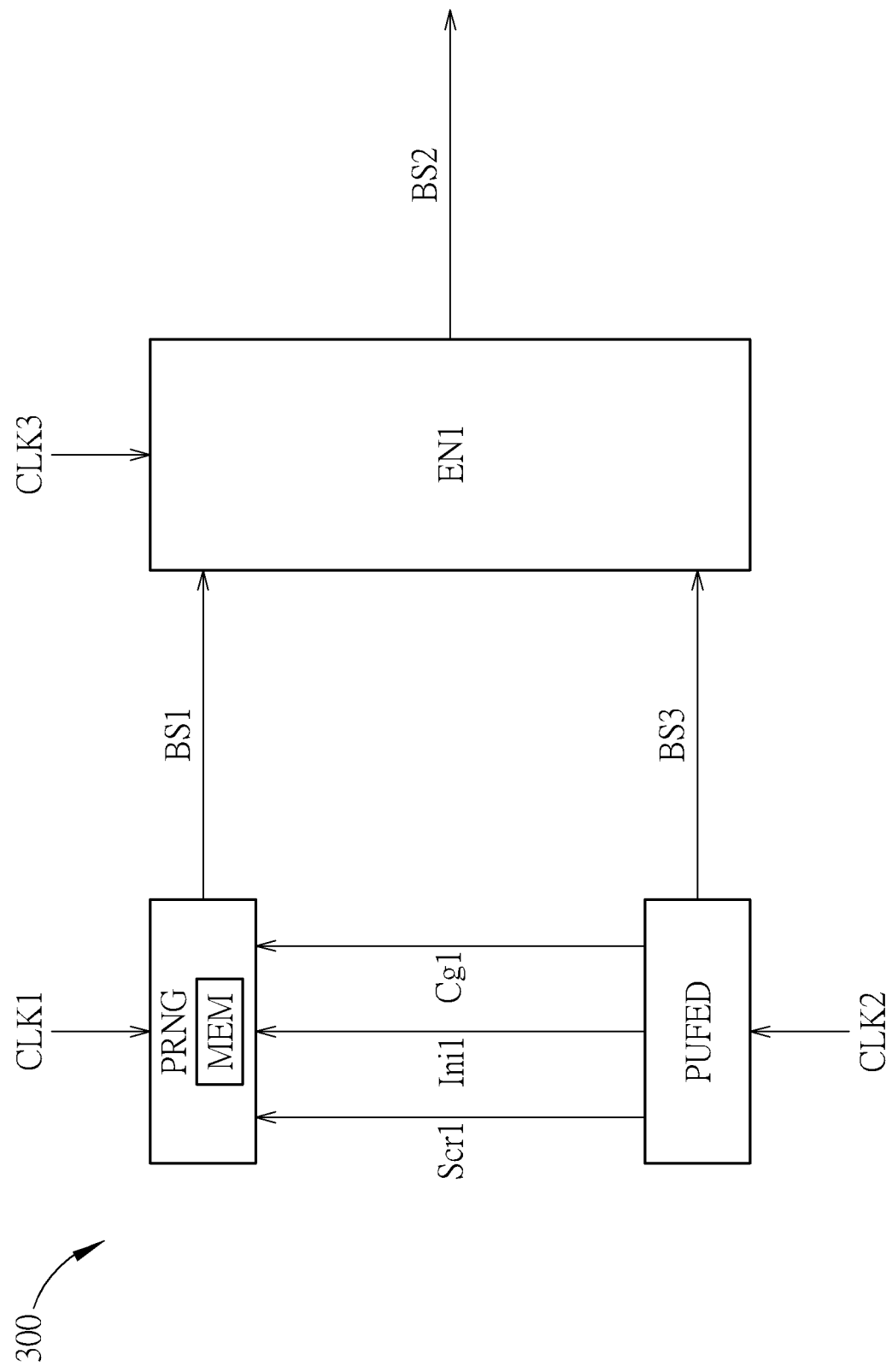
FIG. 3 is a block diagram of introducing clock signals to the true random number generation system in FIG. 2.

FIG. 3 is a block diagram of introducing clock signals to the true random number generation system 200. For avoiding ambiguity, it is called a true random number generation system 300 hereafter. In order to enhance a security level, the true random number generation system 300 can introduce a first clock signal CLK1 and a second clock signal CLK2. The first clock signal CLK1 and the second clock signal CLK2 can be different. The at least one control sequence (i.e., the configuration sequence Cg1, the initial sequence Ini1, and the scramble sequence Scr1) of the pseudo random number generator PRNG can be updated according to the first clock signal CLK1. The plurality of third number sequences BS3 can be sequentially selected from the random number pool of the PUF entropy device PUFED according to the second clock signal CLK2. For example, the configuration sequence Cg1, the initial sequence Ini1, and the scramble sequence Scr1 can be updated simultaneously every 32 clocks. Further, the configuration sequence Cg1, the initial sequence Ini1, and the scramble sequence Scr1 can also be updated individually. For example, the configuration sequence Cg1 can be updated every 512 clocks. The initial sequence Ini1 can be updated every 128 clocks. The scramble sequence Scr1 can be updated every 32 clocks. Further, a third sequence BS3 received by the first encoding circuit EN1. The configuration sequence Cg1, the initial sequence Ini1, and the scramble sequence Scr1 can be updated by using a logical process. For example, when the clock number is counted to 7, the third sequence BS3 received by the first encoding circuit EN1 can be updated. When the clock number is counted to 32, the scramble sequence Scr1 can be updated. When the clock number is counted to 128, the initial sequence Ini1 can be updated. When the clock number is counted to 512, the configuration sequence Cg1 can be updated. Further, a third clock signal CLK3 can be introduced to the true random number generation system 300. The plurality of first number sequences BS1 of the pseudo random number generator PRNG can be received by the first encoding circuit EN1 sequentially according to the third clock signal CLK3. To enhance the design flexibility, the first clock signal CLK1, the second clock signal CLK2 and/or the third clock signal CLK3 can be fixed or varied over time. Therefore, by introducing the first clock signal CLK1, the second clock signal CLK2, and the third clock signal CLK3, randomness and throughput of the plurality of second number sequences BS2 can be flexibility adjusted.

Figure 4:
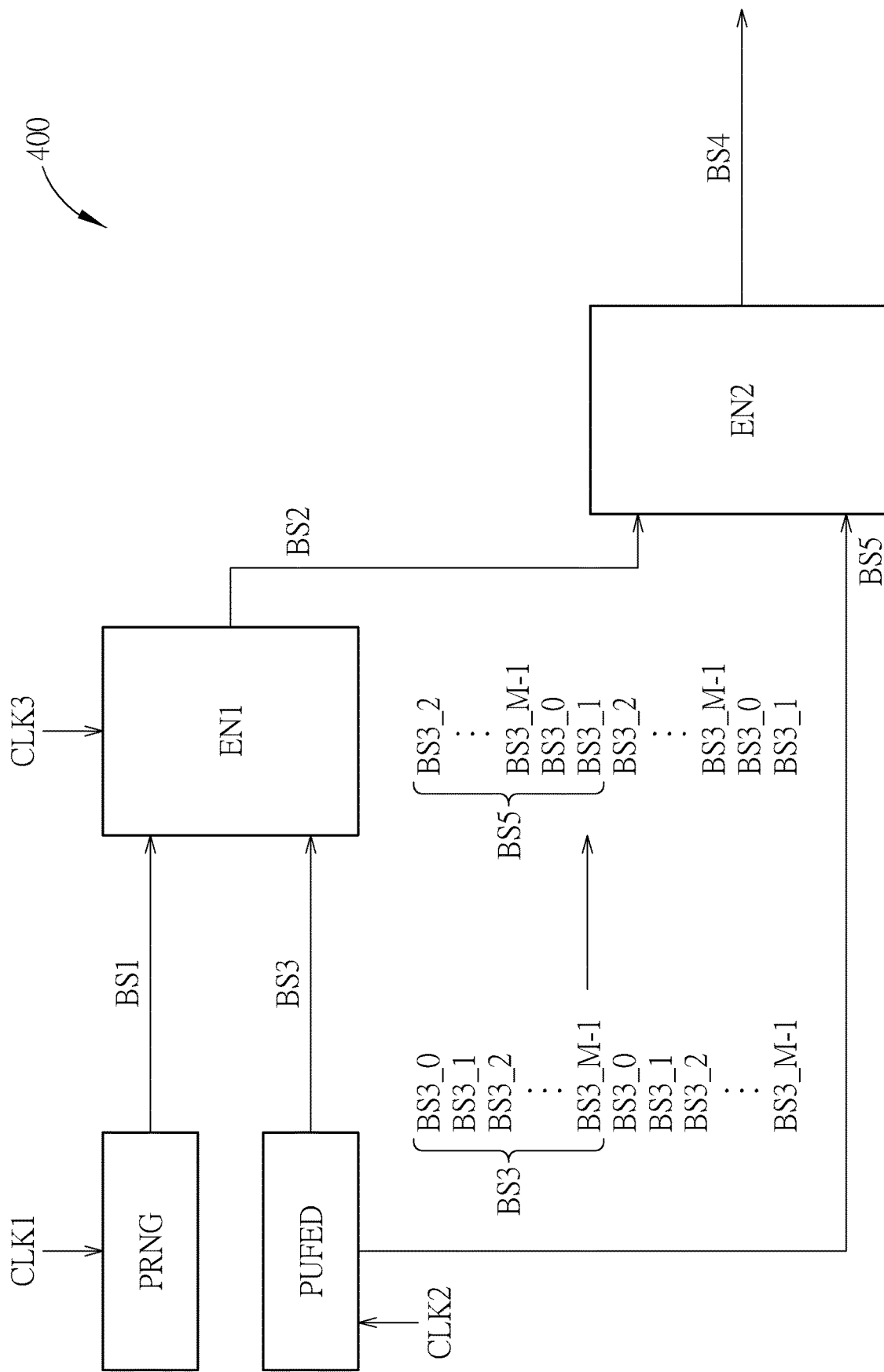
FIG. 4 is a block diagram of introducing a second encoding circuit to the true random number generation system in FIG. 1.

FIG. 4 is a block diagram of introducing a second encoding circuit EN2 to the true random number generation system 100. For avoiding ambiguity, it is called a true random number generation system 400 hereafter. To further increase randomness of outputted random sequences and decrease a requirement of random number pool capacity, the second encoding circuit EN2 can be introduced to the random number generation system 400. The second encoding circuit EN2 is coupled to the first encoding circuit EN1 and the PUF entropy device PUFED for generating a plurality of fourth number sequences BS4 according to the plurality of second number sequences BS2 and a plurality of fifth number sequences BS5. Here, since at least one clock (i.e., the first clock signal CLK1, the second clock signal CLK2, and/or the third clock signal CLK3) is required to perform encoding operations by the first encoding circuit EN1 and the second encoding circuit EN2, allocations of the plurality of third number sequences BS3 selected from the random number pool are circularly shifted over the at least one clock. For example, the plurality of third number sequences BS3 are initially selected from a sequence set in form of {[BS3_0, . . . ,BS3_M−1], [BS3_0, . . . , BS3_M−1], . . . }. After a period of time (i.e., two clocks), the sequence set {[BS3_0, . . . ,BS3_M−1], [BS3_0, . . . ,BS3_M−1], . . . } becomes a sequence set {[BS3_2, . . . ,BS3_M−1], [BS3_0, . . . ,BS3_M−1], BS3_0, BS3_1, . . . }. Therefore, the plurality of fifth number sequences BS5 can be selected from the sequence set {[BS3_2, . . . ,BS3_M−1], [BS3_0, . . . ,BS3_M−1], BS3_0, BS3_1, . . . }. In other words, the plurality of fifth number sequences BS5 can be generated after allocations of the plurality of third number sequences BS3 are circularly shifted over the at least one clock. In the true random number generation system 400, as previously mentioned, the random number pool of the PUF entropy device PUFED can provide a short true random number stream. The pseudo random number generator PRNG can provide a long pseudo random number bit stream. Therefore, the first encoding circuit EN1 can output a long true random number stream with low regularity (i.e., the second number sequences BS2). Further, the second encoding circuit EN2 can output a long true random number stream with almost non-regularity (i.e., the fourth number sequences BS4). In other words, a capacity requirement of the random number pool of the PUF entropy device PUFED in the true random number generation system 400 is smaller than a capacity requirement of the random number pool of the PUF entropy device PUFED in the true random number generation system 100. For example, the capacity requirement of the random number pool of the PUF entropy device PUFED in the true random number generation system 100 is around 2048 bits (2k bits). However, the capacity requirement of the random number pool of the PUF entropy device PUFED in the true random number generation system 400 is around 1024 bits (1k bits). Further, since information of the random number pool is introduced again to generate the plurality of fourth number sequences BS4 after the plurality of second number sequences BS2 are generated, the plurality of fourth number sequences BS4 are more discrete than the plurality of second number sequences BS2.

Figure 5:
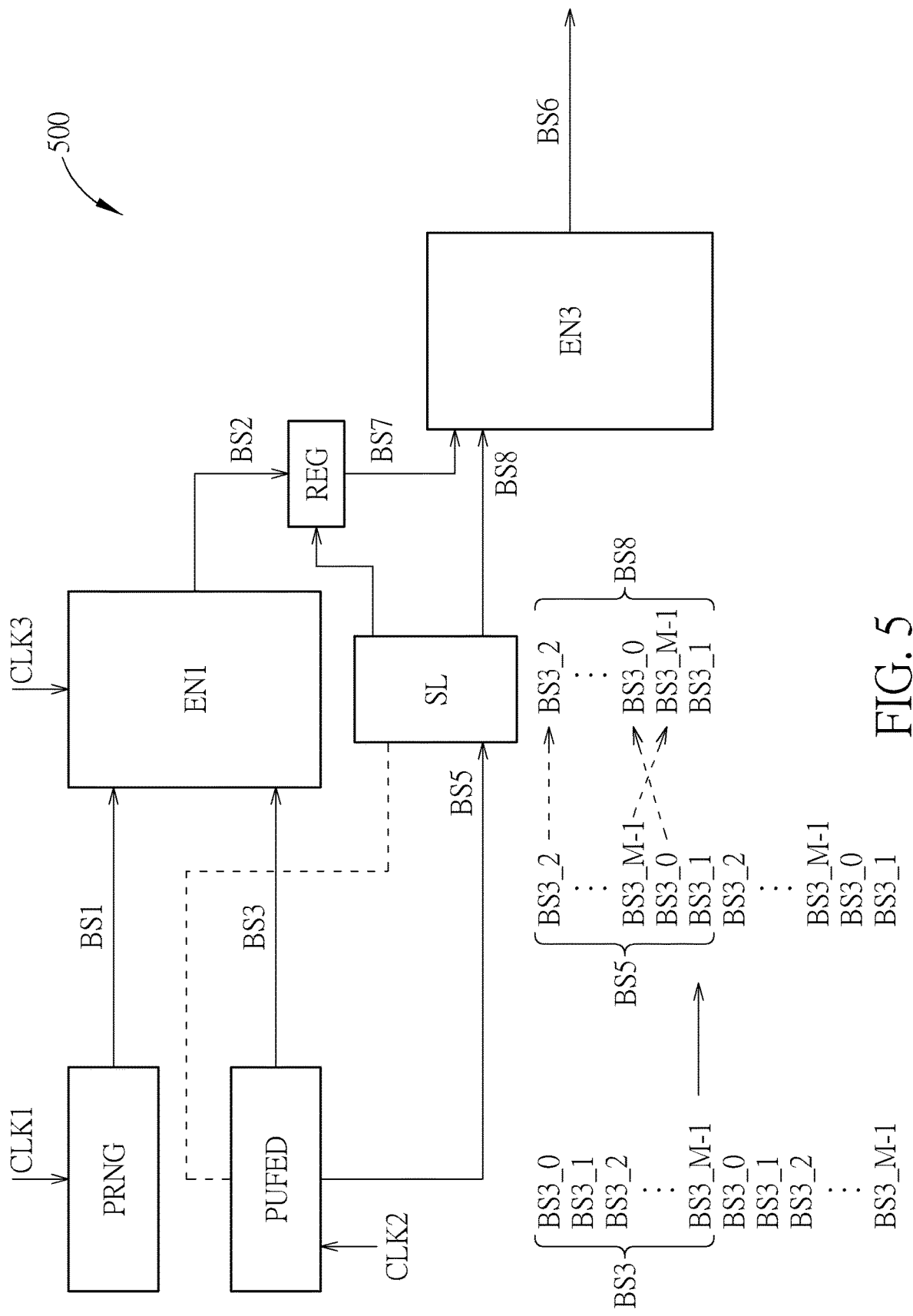
FIG. 5 is a block diagram of introducing a register and a selection unit to the true random number generation system in FIG. 4.

FIG. 5 is a block diagram of introducing a register REG and a selection unit SL to the true random number generation system 400. For avoiding ambiguity, it is called a true random number generation system 500 hereafter. To further increase randomness of outputted random sequences, the register REG and the selection unit SL can be introduced to the random number generation system 500. The selection unit SL is coupled to the PUF entropy device PUFED for generating a selection signal according to the random number pool. Alternatively, the select signal of the selection unit SL can be user-defined. In other words, the select signal of the selection unit SL can be provided, generated, or determined by another data source. The register REG is coupled to the first encoding circuit EN1 and the selection unit SL for buffering each second number sequence BS2 outputted from the first encoding circuit EN1. A third encoding circuit EN3 is coupled to the register REG and the selection unit SL for generating a plurality of sixth number sequences BS6 according to a plurality of seventh number sequences BS7 and a plurality of eighth number sequences BS8. The plurality of seventh number sequences BS7 are outputted from the register REG sequentially. The plurality of eighth number sequences BS8 are generated by the selection unit SL after allocations of the plurality of third number sequences BS3 are circularly shift over at least one clock. Details are illustrated below. As previously mentioned, the plurality of third number sequences BS3 are initially selected from a sequence set in form of {[BS3_0, . . . ,BS3_M−1], [BS3_0, . . . ,BS3_M−1]}. After a period of time (i.e., two clocks), the sequence set {[BS3_0, . . . ,BS3_M−1], [BS3_0, . . . ,BS3_M−1]} becomes a sequence set {[BS3_2, . . . ,BS3_M−1], [BS3_0, . . . ,BS3_M−1], BS3_0, BS3_1}, defined as the fifth number sequences BS5. Then, allocations of the fifth number sequences BS5 including the sequence set {[BS3_2, . . . ,BS3_M−1], [BS3_0, . . . ,BS3_M−1],BS3_0, BS3_1} can be reconfigured as a sequence set {BS3_2, . . . ,BS3_0,BS3_M−1,BS3_1, . . . } by using the selection unit SL. The plurality of eighth number sequences BS8 can be selected from the reconfigured sequence set. In other words, each eighth number sequence BS8 can be randomly selected from one sequence of the sequence set {[BS3_2, . . . ,BS3_M−1], [BS3_0, . . . ,BS3_M−1],BS3_0, BS3_1} (i.e., the fifth number sequences BS5), according to the random number pool. Further, the plurality of third number sequences BS3 have a circular shift period (i.e., for example, a circular shift period equals to M sequences). The selection unit SL reconfigures the allocations of the plurality of third number sequences BS3 according to a mapping function (i.e., the mapping function can be any algorithm based on PUF). A maximum allocation offset of reconfiguring the allocations of the plurality of third number sequences BS3 is smaller than or equal to the circular shift period. For example, for the sequence set {[BS3_2, . . . ,BS3_M−1],[BS3_0, . . . ,BS3_M−1],BS3_0, BS3_1}, a sequence BS3_2 can be selected first by the selection unit SL and then outputted to the third encoding circuit EN3. However, when a maximum allocation offset is equal to M+1, the sequence BS3_2 is still selected and then outputted to the third encoding circuit EN3. Therefore, the maximum allocation offset has to be smaller than or equal to the circular shift period in order to ensure that adjacent sequences outputted to the third encoding circuit EN3 are different. In the true random number generation system 500, the plurality of seventh number sequences BS7 are selected from the plurality of second number sequences BS2 by the register according to the selection signal of the selection unit SL. Details of the generation of the seventh number sequences BS7 is illustrated below.

Figure 6:
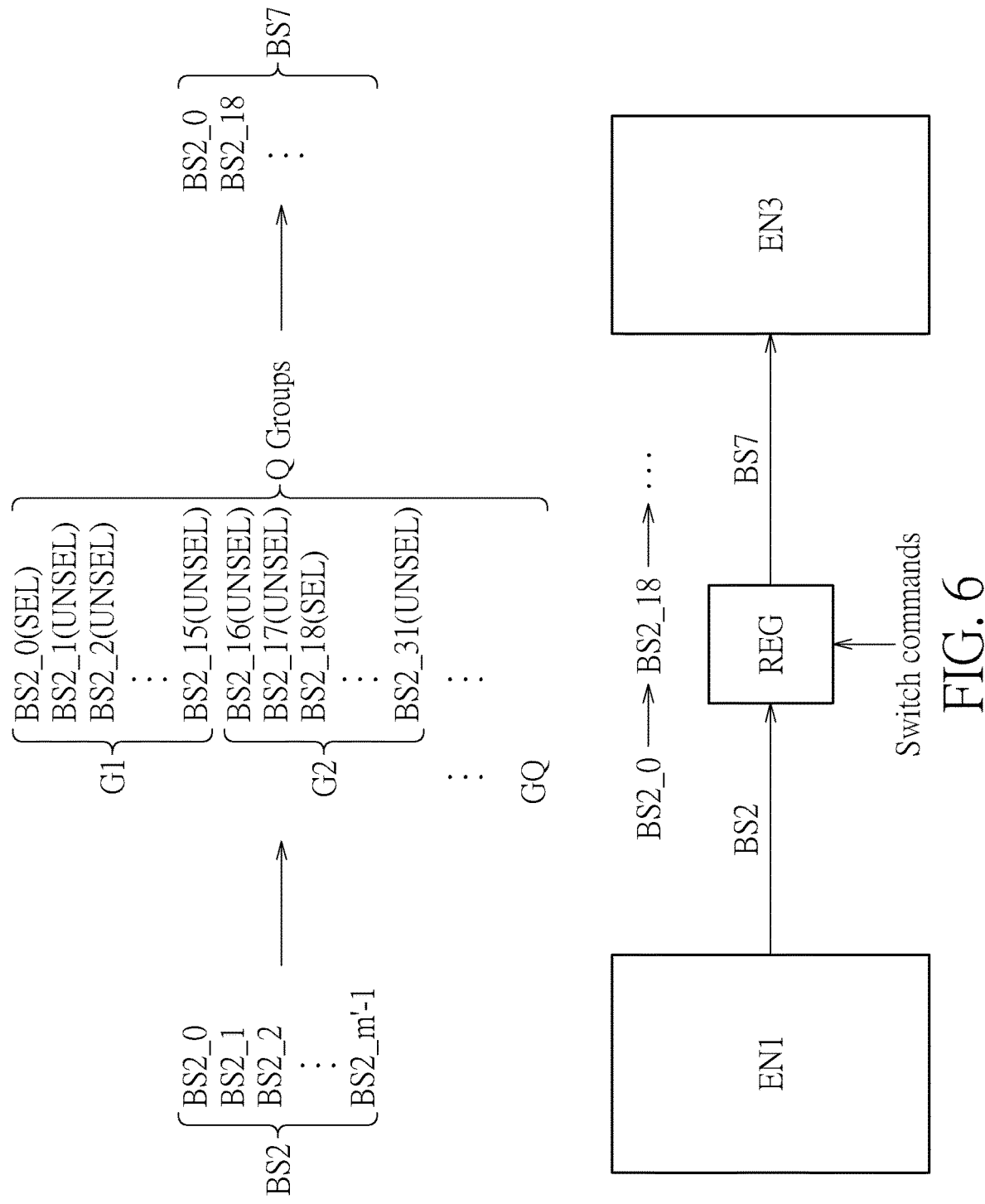
FIG. 6 is an illustration of a sequence selection process between a first encoding circuit and a third encoding circuit of the true random number generation system in FIG. 5.

FIG. 6 is an illustration of a sequence selection process between the first encoding circuit EN1 and the third encoding circuit EN3 of the true random number generation system 500. Here, the plurality of second number sequences BS2 of the first encoding circuit EN1 can be partitioned into Q groups, such as a group G1 to a group GQ. Q is a positive integer of a power of two. Each group includes several sequences. For example, the group G1 includes a sequence BS2_0 to a sequence BS2_15. A group G2 includes a sequence BS2_16 to a sequence BS2_31, and so on. Further, the selection signal includes a plurality of switch commands. Each switch command corresponds to each second number sequence BS2. When a switch command of a second number sequence BS2 corresponds to an unselecting state (for example, a sequence BS2_1 is unselected by the register REG, denoted as BS2_1 (UNSEL)), a second number sequence BS2 is dropped by the register REG. When a switch command corresponds to a selecting state (for example, a sequence BS2_0 is selected by the register REG, denoted as BS2_0 (SEL)), a second number sequence BS2 is selected and then outputted as a seventh number sequence BS7 by the register REG. For example, in the group G1, the sequence BS2_0 corresponds to a switch command with the selecting state. Therefore, the sequence BS2_0 is selected by the register REG and outputted to the third encoding circuit EN3. The sequences BS2_1 to BS2_15 correspond to switch commands with the unselecting state. Therefore, the sequences BS2_1 to BS2_15 are dropped by the register REG. In the group G2, the sequence BS2_18 corresponds to a switch command with the selecting state. Therefore, the sequence BS2_18 is selected and outputted to the third encoding circuit EN3. The sequences BS2_16 to BS2_17 and BS2_19 to BS2_31 correspond to switch commands with the unselecting state. Therefore, the sequences BS2_16 to BS2_17 and BS2_19 to BS2_31 are dropped by the register REG. In other words, the register REG outputs Q seventh number sequences BS7 (i.e. , BS2_0→ BS2_18→ . . . ) sequentially after each seventh number sequence BS7 is selected from each group of the plurality of second number sequences BS2. Similarly, the third encoding circuit EN3 can perform the bitwise exclusive-or function to generate the plurality of sixth number sequences BS6. For example, the third encoding circuit EN3 combines the sequence BS3_2 in FIG. 5 with the sequence BS2_0 in FIG. 6 by using the bitwise exclusive-or function for generating a sixth number sequence BS6.

In the true random number generation system 500, as previously mentioned, the random number pool of the PUF entropy device PUFED can provide a short true random number stream. The pseudo random number generator PRNG can provide a long pseudo random number bit stream. Therefore, the first encoding circuit EN1 can output a long true random number stream with low regularity (i.e., the seventh number sequences BS7). Further, the second encoding circuit EN2 can output a long true random number stream with almost non-regularity (i.e., the sixth number sequences BS6). In other words, a capacity requirement of the random number pool of the PUF entropy device PUFED in the true random number generation system 500 is smaller than a capacity requirement of the random number pool of the PUF entropy device PUFED in the true random number generation system 100. For example, the capacity requirement of the random number pool of the PUF entropy device PUFED in the true random number generation system 100 is around 2048 bits (2k bits). However, the capacity requirement of the random number pool of the PUF entropy device PUFED in the true random number generation system 500 is around 1024 bits (1k bits). Further, since information of the random number pool is introduced again to generate the plurality of sixth number sequences BS6 after the plurality of seventh number sequences BS7 are generated, the plurality of sixth number sequences BS6 are more discrete than the plurality of seventh number sequences BS7.

In the true random number generation systems 100 to 500, any reasonable hardware modification falls into the scope of the present invention. For example, in the random number generation system 200, when the capacity of the random number pool of the PUF entropy device PUFED is large enough, the configuration sequence Cg1, the initial sequence Ini1, and the scramble sequence Scr1 can be varied every clock. Therefore, number sequences (i.e., the first number sequences BS1) outputted from the pseudo random number generator PRNG can form a long true random number bit stream for directly applying to the security mechanisms. In other words, the first encoding circuit EN1 can be omitted. Further, when the random number pool of the PUF entropy device PUFED is very large, number sequences selected from the random number pool can form a long true random number bit stream for directly applying to the security mechanisms. Therefore, the pseudo random number generator PRNG can also be omitted.

Further, the first encoding circuit EN1, the second encoding circuit EN2, and the third encoding circuit EN3 can be reasonably modified. For example, instead of using exclusive-or operator, any bitwise logical operator can be applied to the first encoding circuit EN1, the second encoding circuit EN2, and the third encoding circuit EN3.

To sum up, the present invention discloses a true random number generation system and its modified hardware structures. A purpose of the true random number generation system is to generate a long true random number bit stream. Particularly, the long true random number bit stream can be generated by combining a short true random number bit stream with a long pseudo random bit stream. Further, the short true random number bit is selected from the random number pool generated by using an physical unclonable function (PUF). Since information of the random number pool is used for generating the long true random number bit stream, regularity of the long true random number bit stream is hard to be predicted. Therefore, by applying the long true random number bit stream to security mechanisms (i.e., for example, fingerprint data encryption mechanisms), illegal hackers or data stealers cannot identify or restore contents of data since they cannot use a greedy search method for predicting the regularity of privacy data. Therefore, the true random number generation system of the present invention can provide advanced security reliability and reduce a chance of data exfiltration.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A true random number generation system comprising:
a physical unclonable function (PUF) entropy device configured to generate a random number pool;
a pseudo random number generator configured to generate a plurality of first number sequences according to at least one control sequence; and
a first encoding circuit coupled to the PUF entropy device and the pseudo random number generator and configured to receive a plurality of third number sequences selected from the random number pool, and configured to output a plurality of second number sequences according to the plurality of first number sequences and the plurality of third number sequences;
wherein the plurality of second number sequences are random, the at least one control sequence comprises a configuration sequence, the configuration sequence comprises a plurality of configuration seeds, and the plurality of first number sequences are generated according to the plurality of configuration seeds.

2. The system of claim 1, wherein the pseudo random number generator is coupled to the PUF entropy device and the at least one control sequence is determined according to the random number pool.

3. The system of claim 1, wherein the at least one control sequence further comprises an initial sequence, the initial sequence comprises a plurality of initial seeds, the plurality of initial seeds are configured to indicate an initial number sequence of the first number sequences from all possible number sequences supported by the pseudo random number generator.

4. The system of claim 1, wherein the at least one control sequence further comprises a scramble sequence, the scramble sequence comprises a plurality of scramble seeds, the plurality of scramble seeds are configured to scramble bit allocations of the plurality of first number sequences.

5. The system of claim 1, wherein the at least one control sequence of the pseudo random number generator is updated according to a first clock signal, the plurality of third number sequences are sequentially selected from the random number pool according to a second clock signal, and the first clock signal and the second clock signal are different.

6. The system of claim 1, wherein the first encoding circuit performs a bitwise exclusive-or function to generate the plurality of second number sequences.

7. The system of claim 1, wherein the PUF entropy device performs an antifuse-based PUF by randomly rupturing one of two gate oxide layers of adjacent transistors inside the PUF entropy device.

8. The system of claim 1, wherein the plurality of first number sequences generated by the pseudo random number generator form a pseudo random number bit stream, the plurality of third number sequences selected from the random number pool of the PUF entropy device form a first true random number bit stream, and the plurality of second number sequences generated by the first encoding circuit form a second true random number bit stream.

9. A true random number generation system comprising;
a physical unclonable function (PUF) entropy device configured to generate a random number pool;
a pseudo random number generator configured to generate a plurality of first number sequences according to at least one control sequence;
a first encoding circuit coupled to the PUF entropy device and the pseudo random number generator and configured to receive a plurality of third number sequences selected from the random number pool, and configured to output a plurality of second number sequences according to the plurality of first number sequences and the plurality of third number sequences;
a register configured to receive the plurality of second number sequences and generate a plurality of seventh number sequences selected from the plurality of second number sequences according to a selection signal; and
a third encoding circuit configured to generate a plurality of sixth number sequences according to the plurality of seventh number sequences and a plurality of eighth number sequences derived from the plurality of third number sequences;
wherein the plurality of second number sequences are random.

* * * * *